United States Patent
Wu et al.

(10) Patent No.: US 11,784,779 B2
(45) Date of Patent: Oct. 10, 2023

(54) AUTOMOTIVE ASYMMETRIC ETHERNET USING A FREQUENCY-DIVISION DUPLEX SCHEME WITH A LOW-RATE ECHO CANCELATION

(71) Applicant: Marvell Asia Pte Ltd, Singapore (SG)

(72) Inventors: Xing Wu, Palo Alto, CA (US); Shaoan Dai, San Jose, CA (US); Dance Wu, Palo Alto, CA (US); William Chu, Fremont, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 0 days.

(21) Appl. No.: 18/077,240

(22) Filed: Dec. 8, 2022

(65) Prior Publication Data
US 2023/0188310 A1 Jun. 15, 2023

Related U.S. Application Data

(60) Provisional application No. 63/287,910, filed on Dec. 9, 2021.

(51) Int. Cl.
*H04L 5/14* (2006.01)
*H04L 7/04* (2006.01)
*H04B 3/23* (2006.01)

(52) U.S. Cl.
CPC .............. *H04L 5/14* (2013.01); *H04B 3/23* (2013.01); *H04L 7/04* (2013.01)

(58) Field of Classification Search
CPC .. H04L 5/14; H04L 7/04; H04L 5/143; H04B 3/23; H04J 1/00; H04J 1/085; H04M 7/16; H04Q 11/02
See application file for complete search history.

(56) References Cited

U.S. PATENT DOCUMENTS

RE31,253 E * 5/1983 Weinstein ................ H04B 3/23
370/291
4,481,622 A * 11/1984 Cheng ....................... H04L 5/06
370/295

(Continued)

FOREIGN PATENT DOCUMENTS

EP 2568652 A1 3/2013
EP 3166259 A1 5/2017

OTHER PUBLICATIONS

IEEE Std 802.3cg—2019, "IEEE Standard for Ethernet—Amendment 5: Physical Layer Specifications and Management Parameters for 10 Mb/s Operation and Associated Power Delivery over a Single Balanced Pair of Conductors", pp. 1-256, Feb. 2020.

(Continued)

*Primary Examiner* — Phuongchau Ba Nguyen

(57) ABSTRACT

An Ethernet Physical Layer (PHY) device includes a link interface and a transceiver. The link interface connects to a full-duplex wired Ethernet link. The transceiver receives first Ethernet signals carrying first data at a first data rate over toe Ethernet link at a first baud rate, transmits second Ethernet signals carrying second data at a second data rate higher than the first data rate, over the Ethernet link, at a second baud rate that is higher than the first baud rate, resamples a reference signal related to the second Ethernet signals to match the first baud rate, generates from the resampled reference signal, at the first baud rate, an echo cancelation signal indicative of an echo signal originating from the second Ethernet signals and interfering with reception of the first Ethernet signals, and suppresses the echo signal from the first Ethernet signals using the echo cancelation signal.

16 Claims, 6 Drawing Sheets

(56) References Cited

U.S. PATENT DOCUMENTS

| | | | |
|---|---|---|---|
| 4,535,206 A * | 8/1985 | Falconer | H04B 3/234 379/406.08 |
| 5,393,701 A | 2/1995 | Ko et al. | |
| 5,691,234 A | 11/1997 | Su et al. | |
| 5,702,566 A | 12/1997 | Tsui | |
| 6,566,716 B2 | 5/2003 | Lin et al. | |
| 6,732,190 B1 | 5/2004 | Williams et al. | |
| 6,809,582 B2 | 10/2004 | Morimoto et al. | |
| 6,845,125 B2 * | 1/2005 | Sasaki | H04L 27/2647 375/219 |
| 8,156,359 B1 | 4/2012 | Sedarat et al. | |
| 8,179,910 B2 | 5/2012 | Diab et al. | |
| 8,803,238 B2 | 8/2014 | Kim | |
| 8,948,203 B1 | 2/2015 | Nolan et al. | |
| 9,577,708 B1 | 2/2017 | McClellan et al. | |
| 9,893,756 B1 | 2/2018 | Sedarat et al. | |
| 10,069,521 B1 | 9/2018 | Farjadrad et al. | |
| 10,181,713 B2 | 1/2019 | Bousquet et al. | |
| 10,249,621 B2 | 4/2019 | Visokay et al. | |
| 10,256,941 B1 | 4/2019 | Lo | |
| 10,530,559 B2 | 1/2020 | Wu | |
| 11,121,083 B2 | 9/2021 | Huang | |
| 11,153,063 B2 | 10/2021 | Wu et al. | |
| 11,296,904 B1 | 4/2022 | Benyamin et al. | |
| 11,557,360 B1 | 1/2023 | Lin et al. | |
| 2003/0016770 A1 | 1/2003 | Trans et al. | |
| 2004/0091038 A1 | 5/2004 | Agazzi et al. | |
| 2007/0104124 A1 | 5/2007 | Lee et al. | |
| 2007/0153731 A1 | 7/2007 | Fine | |
| 2009/0097392 A1 | 4/2009 | Diab et al. | |
| 2009/0154455 A1 | 6/2009 | Diab | |
| 2009/0154467 A1 | 6/2009 | Diab | |
| 2009/0154473 A1 | 6/2009 | Diab et al. | |
| 2009/0154593 A1 | 6/2009 | Diab et al. | |
| 2009/0158069 A1 | 6/2009 | Oh | |
| 2009/0201976 A1 | 8/2009 | Shrikhande et al. | |
| 2009/0256674 A1 | 10/2009 | Lee et al. | |
| 2010/0046543 A1 | 2/2010 | Parnaby | |
| 2010/0104056 A1 | 4/2010 | Taich et al. | |
| 2011/0103275 A1 | 5/2011 | Rhelimi | |
| 2011/0191656 A1 | 8/2011 | Bliss et al. | |
| 2012/0002662 A1 | 1/2012 | Wan et al. | |
| 2013/0107765 A1 | 5/2013 | He | |
| 2013/0189932 A1 | 7/2013 | Shen et al. | |
| 2014/0269353 A1 | 9/2014 | Yang et al. | |
| 2015/0381777 A1 | 12/2015 | Dalmia | |
| 2016/0219458 A1 | 7/2016 | Kubota et al. | |
| 2018/0062514 A1 | 3/2018 | Dong et al. | |
| 2018/0183561 A1 * | 6/2018 | Dogiamis | H04W 72/0453 |
| 2018/0309538 A1 | 10/2018 | Verma et al. | |
| 2019/0074257 A1 | 3/2019 | Pritchard et al. | |
| 2019/0082385 A1 | 3/2019 | Shellhammer et al. | |
| 2019/0128936 A1 | 5/2019 | Brown | |
| 2019/0140730 A1 | 5/2019 | Oteri et al. | |
| 2019/0313406 A1 | 10/2019 | Liu et al. | |
| 2019/0369709 A1 | 12/2019 | Mayer et al. | |
| 2020/0288396 A1 | 9/2020 | Park et al. | |
| 2020/0403824 A1 | 12/2020 | Benyamin et al. | |
| 2021/0067193 A1 | 3/2021 | Dai et al. | |
| 2021/0243001 A1 | 8/2021 | Dalmia | |
| 2022/0190875 A1 | 6/2022 | Razavi Majomard et al. | |

OTHER PUBLICATIONS

IEEE Std 802.3bw™—2015, "IEEE Standard for Ethernet—Amendment 1: Physical Layer Specifications and Management Parameters for 100 Mb/s Operation over a Single Balanced Twisted Pair Cable (100BASE-T1)," pp. 1-88, Mar. 2016.

IEEE Std 802.3bp—2016, "IEEE Standard for Ethernet—Amendment 4: Physical Layer Specifications and Management Parameters for 1 Gb/s Operation over a Single Twisted-Pair Copper Cable", pp. 1-211, Sep. 2016.

IEEE Std 802.3ch—2020, "IEEE Standard for Ethernet—Amendment 8: Physical Layer Specifications and Management Parameters for 2.5 Gb/s, 5 Gb/s and 10 Gb/s Automotive Electrical Ethernet," pp. 1-207, Jun. 2020.

"How Much Does Office Building Wiring Cost?", CostOwl.com, pp. 1-3, Dec. 8, 2021, as downloaded from https://www.costowl.com/b2b/cabling-wiring/cabling-wiring-office-building-cost/.

International Standard ISO/IEC11801, "Information Technology—Generic Cabling for Customer Premises," second edition, Sep. 2002, International Organization for Standardization, pp. 1-140, year 2004.

IEEE Std 802.3ae—2002, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications—Amendment: Media Access Control (MAC) Parameters, Physical Layers, and Management Parameters for 10 Gb/s Operation," pp. 1-529, Aug. 30, 2002.

Barrass et al, "10GBASE-T: 10 Gigabit Ethernet over Twisted-Pair Copper," Ethernet Alliance, version 1.0, pp. 1-44, Aug. 2007.

Jones, "10GBASE-T Tutorial Overview," Institute for Electrical and Electronics Engineering, Interim, pp. 1-34, Jan. 2003.

Muller et al., "IEEE 802 10GBASE-T Tutorial—Overview," Institute for Electrical and Electronics Engineering, pp. 1-56, Nov. 2003.

Unberboeck, "10GBASE-T: 10Gbits/s Ethernet over Copper," Broadcom, pp. 1-23, Sep. 2006.

IEEE Std 802.3ak—2004, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications—Amendment: Physical Layer and Management Parameters for 10 Gb/s Operation, Type 10GBASE—CX4," pp. 1-56, Mar. 1, 2004.

IEEE Std 802.3an—2006, "IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications—Amendment: Physical Layer and Management Parameters for 10 Gb/s Operation, Type 10GBASE-T," pp. 1-181, Sep. 1, 2006.

Sedarat, "Optimized Asymmetric Operation—Technical Feasibility," Ethernovia, pp. 1-22, Jan. 16, 2020.

Parmar, U.S. Appl. No. 17/691,141, filed Mar. 10, 2022.

U.S. Appl. No. 17/497,744 Office Action dated Apr. 7, 2023.

U.S. Appl. No. 17/963,463 Office Action dated Jun. 23, 2023.

* cited by examiner

AUTOMOTIVE ASYMMETRIC ETHERNET USING A FREQUENCY-DIVISION DUPLEX SCHEME WITH A LOW-RATE ECHO CANCELATION

CROSS-REFERENCE TO RELATED APPLICATIONS

This application claims the benefit of U.S. Provisional Patent Application 63/287,910, filed Dec. 9, 2021, whose disclosure is incorporated herein by reference.

FIELD OF THE DISCLOSURE

The present disclosure relates generally to network communication, and particularly to methods and systems for automotive asymmetric ethernet using a frequency-division duplex scheme with a low-rate echo cancelation.

BACKGROUND

Various applications, such as automotive in-car communication systems, certain industrial communication systems and smart-home systems, require communication at high data rates over relatively small distances. Several types of protocols and communication media have been proposed for such applications. For example, Ethernet communication over twisted-pair copper wire media specified in "IEEE Standard for Ethernet Amendment 1: Physical Layer Specifications and Management Parameters for 100 Mb/s Operation over a Single Balanced Twisted Pair Cable (100BASE-T1)," IEEE 802.3bw-2015, March, 2016; and in "IEEE Standard for Ethernet—Amendment 8:Physical Layer Specifications and Management Parameters for 2.5 Gb/s, 5 Gb/s, and 10 Gb/s Automotive Electrical Ethernet," IEEE 802.3ch-2020, June, 2020.

The description above is presented as a general overview of related art in this field and should not be construed as an admission that any of the information it contains constitutes prior art against the present patent application.

SUMMARY

An embodiment that is described herein provides an Ethernet Physical Layer (PHY) device that includes a link interface and a transceiver. The link interface is configured to connect to a full-duplex wired Ethernet link. The transceiver is configured to receive first Ethernet signals carrying first data at a first data rate over the Ethernet link in a first direction at a first baud rate, to transmit second Ethernet signals carrying second data at a second data rate higher than the first data rate, over the Ethernet link in a second direction that is opposite the first direction, at a second baud rate that is higher than the first baud rate, to resample a reference signal that is related to the second Ethernet signals to match the first baud rate of the first Ethernet signals, to generate from the resampled reference signal, at the first baud rate, an echo cancelation signal indicative of an echo signal originating from the second Ethernet signals and interfering with reception of the first Ethernet signals, and to suppress the echo signal from the first Ethernet signals using the echo cancelation signal.

In some embodiments, the transceiver is configured to resample the reference signal by filtering the reference signal using a re-sampling filter, and to suppress the echo signal from the first Ethernet signals by subtracting the echo cancelation signal from the first Ethernet signals, at the first baud rate that is lower than the second baud rate. In other embodiments, the first Ethernet signals occupy a first frequency band, the second Ethernet signals occupy a second frequency band different from the first frequency band, and the transceiver is configured to simultaneously receive the first Ethernet signals in the first frequency band over the Ethernet link and transmit the second Ethernet in the second frequency band over the Ethernet link. In yet other embodiments, the transceiver includes a first analog filter tuned to the first frequency band and configured to filter the first Ethernet signals received from the Ethernet link, and a second analog filter tuned to the second frequency band and configured to filter the second Ethernet signals transmitted to the Ethernet link.

In an embodiment, the first analog filter is configured to suppress frequencies above the first data rate, and the second analog filter is configured to suppress frequencies below the second data rate. In another embodiment, the transceiver is configured to locally generate a second clock signal for transmission of the second Ethernet signals over the Ethernet link at the second baud rate, and to derive a first clock signal from the second clock signal for reception of the first Ethernet signals at the first baud rate. In yet another embodiment, the transceiver is configured to derive the first clock signal from the second clock signal, by applying to the second clock signal a circuit that divides a frequency of the second clock by a number defining a ratio between the second baud rate and the first baud rate.

In some embodiments, the transceiver is locally coupled to a sensor in a vehicle, the sensor providing the second data to the transceiver for transmission, and is configured to receive the first data from a processor in the vehicle over the Ethernet link.

There is additionally provided, in accordance with an embodiment that is described herein, a method for communication, including, in an Ethernet Physical Layer (PHY) device connected to a full-duplex wired Ethernet link, receiving first Ethernet signals carrying first data at a first data rate over the Ethernet link in a first direction at a first baud rate. Second Ethernet signals carrying second data are transmitted at a second data rate higher than the first data rate, over the Ethernet link in a second direction that is opposite the first direction, at a second baud rate that is higher than the first baud rate. A reference signal that is related to the second Ethernet signals is resampled to match the first baud rate of the first Ethernet signals. An echo cancelation signal indicative of an echo signal originating from the second Ethernet signals and interfering with reception of the first Ethernet signals is generated from the resampled reference signal, at the first baud rate. The echo signal is suppressed from the first Ethernet signals using the echo cancelation signal.

There is additionally provided, in accordance with an embodiment that is described herein, an Ethernet Physical Layer (PAY) device, including a link interface and a transceiver. The link interface is configured to connect to a full-duplex wired Ethernet link. The transceiver is configured to receive first Ethernet signals carrying first data at a first data rate over the Ethernet link in a first direction at a first baud rate, to transmit second Ethernet signals carrying second data at a second data rate lower than the first data rate, over the Ethernet link in a second direction that is opposite the first direction, at a second baud rate that is lower than the first baud rate, to recover from the first Ethernet signals a first clock signal associated with the first baud rate, to derive from the first clock signal a second clock signal associated with the second baud rate, and to transmit the second Ethernet signals using the second clock signal.

In some embodiments, the first Ethernet signals occupy a first frequency, band, the second Ethernet occupy a second frequency band different from the first frequency band, and the transceiver is configured to simultaneously receive the first Ethernet signals in the first frequency band over the Ethernet link and transmit the second Ethernet signal in the second frequency band over the Ethernet link. In other embodiments, the Ethernet PHY device according includes a first analog filter tuned to the first frequency band and configured to filter the first Ethernet signals received from the Ethernet link, and a second analog filter tuned to the second frequency band and configured to filter the second Ethernet signals transmitted to the Ethernet link. In yet other embodiments, the first analog filter is configured to suppress frequencies below the first data rate, and the second analog filter is configured to suppress frequencies above the second data rate.

In an embodiment, the transceiver is configured to derive the second clock signal from the first clock signal, by applying to the first clock signal a circuit that divides a frequency of the first clock by a number defining a ratio between the first baud rate and the second baud rate. In another embodiment, the transceiver is configured to process the first Ethernet signals received, without applying echo cancelation for suppressing signals that were caused by transmitting the second Ethernet signals and interfering with reception of the first Ethernet signals.

In yet other embodiments, the transceiver is locally coupled to a processor in a vehicle, the processor providing the second data to the transceiver for transmission, and is configured to receive the first data from a sensor in the vehicle over the Ethernet link.

There is additionally provided, in accordance with an embodiment that is described herein, a method for communication, including, in an Ethernet Physical Layer (PHY) device that is connected to a full-duplex wired Ethernet link, receiving first Ethernet signals carrying first data at a first data rate over the Ethernet link in a first direction at a first baud rate. Second Ethernet signals carrying second data are transmitted at a second data rate lower than the first data rate, over the Ethernet link in a second direction that is opposite the first direction, at a second baud rate that is lower than the first baud rate. A first clock signal associated with the first baud rate is recovered from the first Ethernet signals. A second clock signal associated with the second baud rate is derived from the first clock signal. The second Ethernet signals are transmitted using the second clock signal.

The present disclosure will be more fully understood from the following detailed description of the embodiments thereof, taken together with the drawings in which:

DETAILED DESCRIPTION OF EMBODIMENTS

Figure 1:
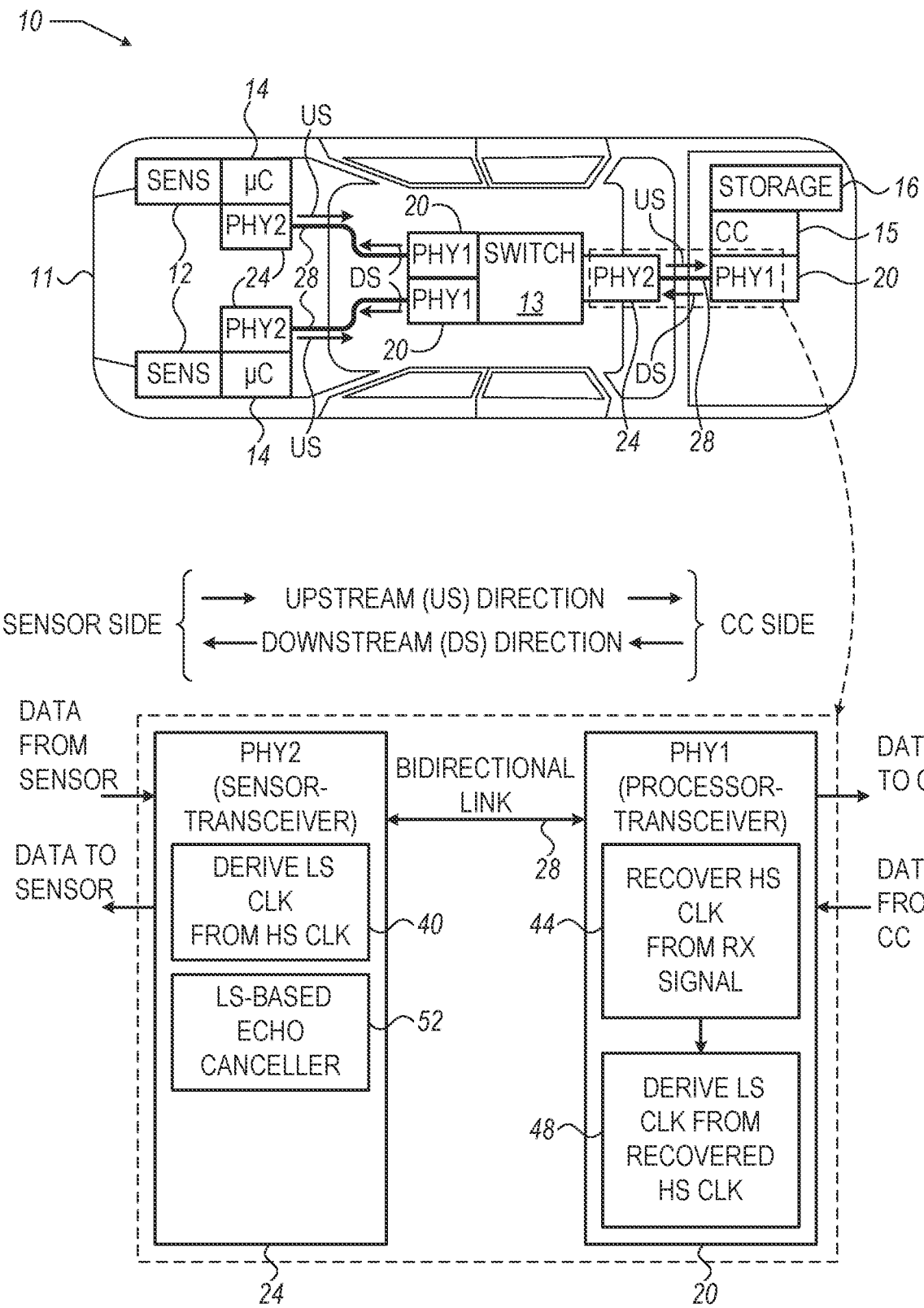
FIG. 1 is a block diagram that schematically illustrates an automotive communication system, communicating at different upstream and downstream data rates, in accordance with an embodiment that is described herein.

Embodiments that are described herein provide Ethernet physical layer (PHY) transceivers and associated methods, for communication over full-duplex two-way channels. For example, these might be twisted-pair copper wire links in an automotive Ethernet network, or other suitable wired links having more than a single twisted pair in other suitable networks. The embodiments described herein refer mainly to asymmetric links, in which the transmission data rates differ between the two directions of the two-way link. In the disclosed embodiments, simultaneous asymmetric communication is based on a Frequency-Division Duplex (FDD) scheme.

The asymmetric PHY transceivers described herein are useful, for example, in automotive applications, e.g., systems that collect data from sensors within a vehicle and also control and configure the sensors. High resolution sensors may be used, for example, in Advanced Driver-Assistance Systems (ADAS) and in Autonomous Driving (AD) systems. The disclosed techniques are generally applicable, however, in various other applications that involve asymmetric links, for example in industrial and/or smart-home networks, as well as in video distribution systems. Certain aspects of bidirectional asymmetric Ethernet communication in such environments are addressed in U.S. Pat. No. 11,296,904, entitled "Asymmetric Energy Efficient Ethernet"; and in U. S. Pat. No. 11,153,063, entitled "Managing Bidirectional Communication in Constrained Environments" which are assigned to the assignee of the present patent application and whose disclosures are incorporated herein by reference. Aspects related to crosstalk in asymmetric link configurations are described, for example, in U.S. patent application Ser. No. 17/549,744, entitled "Network using Asymmetric Uplink and Downlink Baud Rates to Reduce Crosstalk" which is assigned to the assignee of the present patent application and whose disclosure is incorporated here by reference.

Consider a pair of Ethernet PHY transceivers that communicate with one another in full-duplex over a single twisted-pair link. In an automotive communication network, one PHY transceiver, referred to as a "sensor-transceiver," is coupled to one or more sensors of the vehicle, and the other PHY transceiver, referred to as a "processor-transceiver," is coupled to a processor in the vehicle, such as a central controller.

In an "upstream direction" from the sensor-transceiver to the processor-transceiver, the sensor-transceiver is configured to transmit data to the processor-transceiver over the Ethernet link at a selectable "upstream data rate," and a "downstream direction" from the processor-transceiver to the sensor-transceiver, the sensor-transceiver is configured to receive data from the processor-transceiver over the Ethernet link at a selectable "downstream data rate." In the present context and in the claims, the term "data rate" refers to the amount of information (measured, e.g., in bits) transferred over a communication channel in a time unit.

It is noted that communication at a specified data rate means communication at a data rate not exceeding the specified data rate.

In a vehicular network example, the sensors may comprise various sensor types such as, for example, a video camera, radar sensors, lidar sensors, ultrasonic sensors, and the like. When the vehicle is operational for driving, the sensors typically send High-Speed (HS) data, such as sensor data, to the processor in the upstream direction, and receive Low-Speed (LS) data, such as control and configuration data, from the processor in the downstream direction. In this setup, to utilize the link bandwidth efficiently, the PHY transceivers are configured to communicate using an upstream data rate that is higher than the downstream data rate.

In the disclosed embodiments, full-duplex asymmetric communication is achieved by employing a Frequency-Division Duplex (FDD) scheme, in which separate frequency bands are allocated for the upstream and downstream directions. In this FDD scheme, a low frequency band is allocated for Low-Speed (LS) transmission in the downstream direction, and a high frequency band is allocated for High-Speed (HS) transmission in the upstream direction.

In some embodiments downstream LS communication is based on the 100BASE-T1 specification, and HS upstream communication is based on the Multi-GigaBASE-T1 specification.

A Physical Layer (PHY) device such as an Ethernet PHY device typically implements a transceiver comprising a transmitter and a receiver. In full-duplex communication, the transmitter and receiver on the same side of the link operate simultaneously. Since transmission power is typically much higher than the power of signals received over the link, signals originating in the transmitter may interfere with reception of the received signals by the same PHY. To suppress such interference, echo cancelation methods may be employed. Echo cancelation, however, typically is costly, requires large chip area and consumes large amounts of power, especially when operating at high data rates.

In some embodiments, due to the FDD separation between the frequency bands allocated for the upstream and downstream directions, and low power transmission in the downstream direction, echo cancellation can be omitted in the processor-transceiver, and a simplified low-rate echo canceller can be used in the sensor-transceiver, thereby reducing cost, chip area and power consumption.

Consider an embodiment of an Ethernet Physical Layer (PHY) device, comprising a link interface and a transceiver. In this embodiment, the transceiver functions as a sensor-side transceiver. The link interface connects to a full-duplex wired Ethernet link. The transceiver is configured to receive first Ethernet signals carrying first data at a first data rate over the Ethernet link in a first direction at a first baud rate, to transmit second Ethernet signals carrying second data at a second data rate higher than the first data rate, over the Ethernet link in a second direction that is opposite the first direction, at a second baud rate that is higher than the first baud rate, to resample a reference signal that is related to the second Ethernet signals to match the first baud rate of the first Ethernet signals, to generate from the resampled reference signal, at the first baud rate, an echo cancelation signal indicative of an echo signal originating from the second Ethernet signals and interfering with reception of the first Ethernet signals, and suppress the echo signal from the first Ethernet signals using the echo cancelation signal.

In some embodiments, the transceiver is configured to resample the reference signal by filtering the reference signal using a re-sampling filter, and to suppress the echo signal from the first Ethernet signals by subtracting the echo cancelation signal from the first Ethernet signals, at the first baud rate that is lower than the first baud rate.

In applying a FDD scheme, the first Ethernet signals occupy a first frequency band, and the second Ethernet signals occupy a second frequency band different from the first frequency band. The transceiver is configured to simultaneously receive the first Ethernet signals in the first frequency band over the Ethernet link and transmit the second Ethernet in the second frequency band over the Ethernet link.

In an embodiment, for separating between the FDD frequency bands, the transceiver comprises a first filter, for example an analog filter, tuned to the first frequency band and configured to filter the first Ethernet signals received from the Ethernet link, and a second filter, for example an analog filter, tuned to the second frequency band and configured to filter the second Ethernet signals transmitted to the Ethernet link. The first analog filter functions as a High-Pass Filter (HPF) that suppresses frequencies above the first data rate, and the second analog filter functions as a Low-Pass Filter (LPF) that suppresses frequencies below the second data rate.

In some embodiments, the transceiver is configured to locally generate a HS clock signal for transmission of the second Ethernet signals over the Ethernet link at the second baud rate, and to derive a LS clock signal from the HS clock signal for reception of the first Ethernet signals at the first baud rate. To this end, the transceiver applies to the HS clock signal a circuit that divides a frequency of the HS clock signal by a number defining a ratio between the second baud rate and the first baud rate.

Next consider another embodiment of a PHY device, comprising a link interface and a transceiver. In this embodiment, the transceiver functions as a processor-side transceiver. The link interface connects to a full-duplex wired Ethernet link. The transceiver is configured to receive first Ethernet signals carrying first data at a first data rate over the Ethernet link in a first direction at a first baud rate, to transmit second Ethernet signals carrying second data at a second data rate lower than the first data rate, over the Ethernet link in a second direction that is opposite the first direction, at a second baud rate that is lower than the first baud rate, to recover from the first Ethernet signals a HS clock signal associated with the first baud rate, to derive from the HS clock signal a LS clock signal associated with the second baud rate, and to transmit the second Ethernet signals using the LS clock signal.

In applying a FDD scheme, the first Ethernet signals occupy a first frequency band, the second Ethernet occupy a second frequency band different from the first frequency band. The transceiver is configured to simultaneously receive the first Ethernet signals in the first frequency band over the Ethernet link and transmit the second Ethernet in the second frequency band over the Ethernet link.

In an embodiment, for separating between the FDD frequency bands, the transceiver comprises a first filter, for example an analog filter, tuned to the first frequency band and configured to filter the first Ethernet signals received from the Ethernet link, and a second filter, for example an analog filter tuned to the second frequency band and configured to filter the second Ethernet signals transmitted to the Ethernet link. The first analog filter functions as a LPF that suppresses frequencies below the first data rate, and the second analog filter functions as a HPF that suppress frequencies above the second data rate.

In some embodiments, the transceiver is configured to derive the LS clock signal from the HS clock signal, by applying to the HS clock signal a circuit that divides a frequency of the HS clock signal by a number defining a ratio between the first baud rate and the second baud rate.

In an embodiment, the transceiver is configured to process the first Ethernet signals received, without applying echo cancelation for suppressing signals that were caused by transmitting the second Ethernet signals and interfering with reception of the first Ethernet signals.

In the disclosed techniques, an FDD scheme is employed for asymmetric communication over a bidirectional wired link. In accordance with the FDD scheme separate low and high frequency bands are allocated for the downstream (LS) and upstream (HS) directions, respectively. Due to the FDD frequency separation, echo cancellation in the transceiver having the LS receiver can be omitted, and a simplified echo cancelation operating at a low rate is applicable in the transceiver having the HS receiver. A loop clocking scheme is implemented. In one transceiver, a HS clock signal for HS transmission is generated, and a LS clock for LS reception is derived from the HS clock signal. In the other transceiver, the HS clock is recovered from the HS signals received, and a LS clock used for LS transmission is derived from the recovered HS clock.

The disclosed techniques are applicable, for example, in asymmetric Ethernet communication in a vehicle. Implementing the disclosed embodiments may be based on modifying PHY devices designed for standard LS and HS Ethernet communication, such as, for example, the 100BASE-T1 and the Multi-GigaBASE-T1 standards.

FIG. 1 is a block diagram that schematically illustrates an automotive communication system 10, communicating at different upstream and downstream data rates, in accordance with an embodiment that is described herein. Automotive communication system 10 is installed in a vehicle 11, and comprises multiple sensors 12, an Ethernet switch 13, multiple microcontrollers (μC) 14, a central controller (CC) 15 coupled to a storage device 16, multiple Ethernet physical layer (PHY) transceivers 20 of a first type (denoted PHY1), and multiple Ethernet PHY transceivers 24 of a second type (denoted PHY2).

In various embodiments, sensors 12 may comprise any suitable types of sensors. Several non-limiting examples of sensors comprise video cameras, velocity sensors, accelerometers, audio sensors, infra-red sensors, radar sensors, lidar sensors, ultrasonic sensors, rangefinders or other proximity sensors, and the like. Although only two sensors are seen for purposes of simplicity and clarity, a typical vehicle will include numerous sensors 12.

In the present example, each sensor 12 is connected to a respective microcontroller 14, which is in turn connected to a respective PHY transceiver 24 (PHY2). The PHY transceiver 24 of each sensor 12 is connected by a link 28 to a peer PHY transceiver 20 (PHY1) coupled to a port of Ethernet switch 13. On the sensor side of a given link, microcontroller 14 serves for example as a Medium Access Control (MAC) controller. On the switch side of a given link, MAC functions are carried out by suitable circuitry withing the Ethernet switch 13.

Automotive communication system 10 is an example use-case suitable for asymmetric Ethernet communication. Typically, sensors 12 generate large amounts of data that are sent to central computer (CC) 15 for analysis and/or display. In the opposite direction, the data typically comprise low-rate control and configuration data from CC 15 to sensors 12. In such a scenario, asymmetric communication provides better utilization of Ethernet links 28.

In the embodiment of FIG. 1, the direction from sensors 12 to central controller 15 (i.e., from PHY2 to PHY1) is referred to as an upstream direction (denoted US), whereas the direction from central controller 15 to sensors 12 (i.e., from PHY1 to PHY2) is referred to as a downstream direction (denoted DS).

In communication system 10, for a given pair of PHY transceivers comprising PHY1 and PHY2 coupled by a link 28, the PHY transceiver coupled closer to the sensors in a network path between a sensor and the processor, is also referred to herein as a "sensor-transceiver." In the given pair of PRY transceivers, the PHY transceiver coupled closer in the network path to the central controller is also referred to herein as a "processor-transceiver." In the embodiment of FIG. 1, PHY transceivers PHY1 serve as processor-transceivers, and PRY transceivers PHY2 serve as sensor-transceivers.

In the embodiment of FIG. 1, PHY transceivers 20 (PHY1) transmit at a data rate referred to as a "downstream data rate" and receive at a data rate referred to as an "upstream data rate." PHY transceivers 24 (PHY2) transmit at the upstream data rate and receive at the downstream data rate. Pairs of PHY transceivers 20 and 24 communicate with one another over twisted-pair copper links 28, which serve as full-duplex wire channels. As seen in the figure, the pairs of PHY transceivers 20 and 24 are arranged so that transmission from sensors 12 to CC 15 is performed in the upstream direction at the upstream data rate, and transmission from CC 15 to sensors 12 is performed in the downstream direction at the downstream data rate, in an embodiment.

In one embodiment, the upstream data rate is 10 G bits per second (10 Gbps) in accordance with IEEE 802.3ch, and the downstream data rate is 100 Mbps in accordance with IEEE 802.3bw (100BASF-T1). In alternative embodiments, the downstream data rate and the upstream data rate may be chosen to be any other suitable bit rates. The link between PHY transceivers 20 and 24 may comprise any other two-way medium suitable for full-duplex communication.

The lower part of FIG. 1 depicts one pair of PHY transceivers PHY1 (20) and PHY2 (24) communicating with one another over link 28. In the selected pair, PHY1 is coupled directly to CC 15, and PHY2 is coupled indirectly to each of sensors 12 via a network path including Ethernet switch 13, another pair of PHY1 and PHY2 and microcontroller 14.

PHY 1 and PHY2 communicate with one another by sending symbols over link 28 is accordance with suitable modulation schemes such as PAM. The rate of symbols transmitted over link 28 is also referred to as a "baud rate." In the description that follows, a clock signal related to downstream transmission from PHY1 to PHY2 is referred to as a Low-Speed (LS) clock signal, whereas a clock signal related to upstream transmission from PHY2 to PHY1 is referred to as a High-Speed (HS) clock signal.

In some embodiments, transceivers PH1 and PHY2 manage a timing loop in generating the LS clock signal and HS clock signal. To this end, PHY2 (the sensor-transceiver) generates the HS clock for transmission, and using a clock converter 40, derives from the HS clock signal the LS clock signal for reception. On the other side of the link, PHY1 receives the HS signals transmitted by PHY2 and recovers the HS clock from the HS signals using a clock recovery module 44. A clock converter 48 in PHY1 derives from the recovered HS clock signal a recovered LS clock signal to be used for downstream transmission from PHY1 to PHY2.

In some embodiments, PHY2 comprises an echo canceller 52. The echo canceller is configured to suppress echo signals originating from the transmitter of the sensor-transceiver and interfere with reception of signals received from link 28 by a receiver of the sensor-transceiver. In some embodiments, echo canceller 52 operates at the LS clock signal that was derived locally from the HS clock signal, which allows using a simplified echo canceller, thereby reducing cost, chip area and power consumption.

Figure 2:
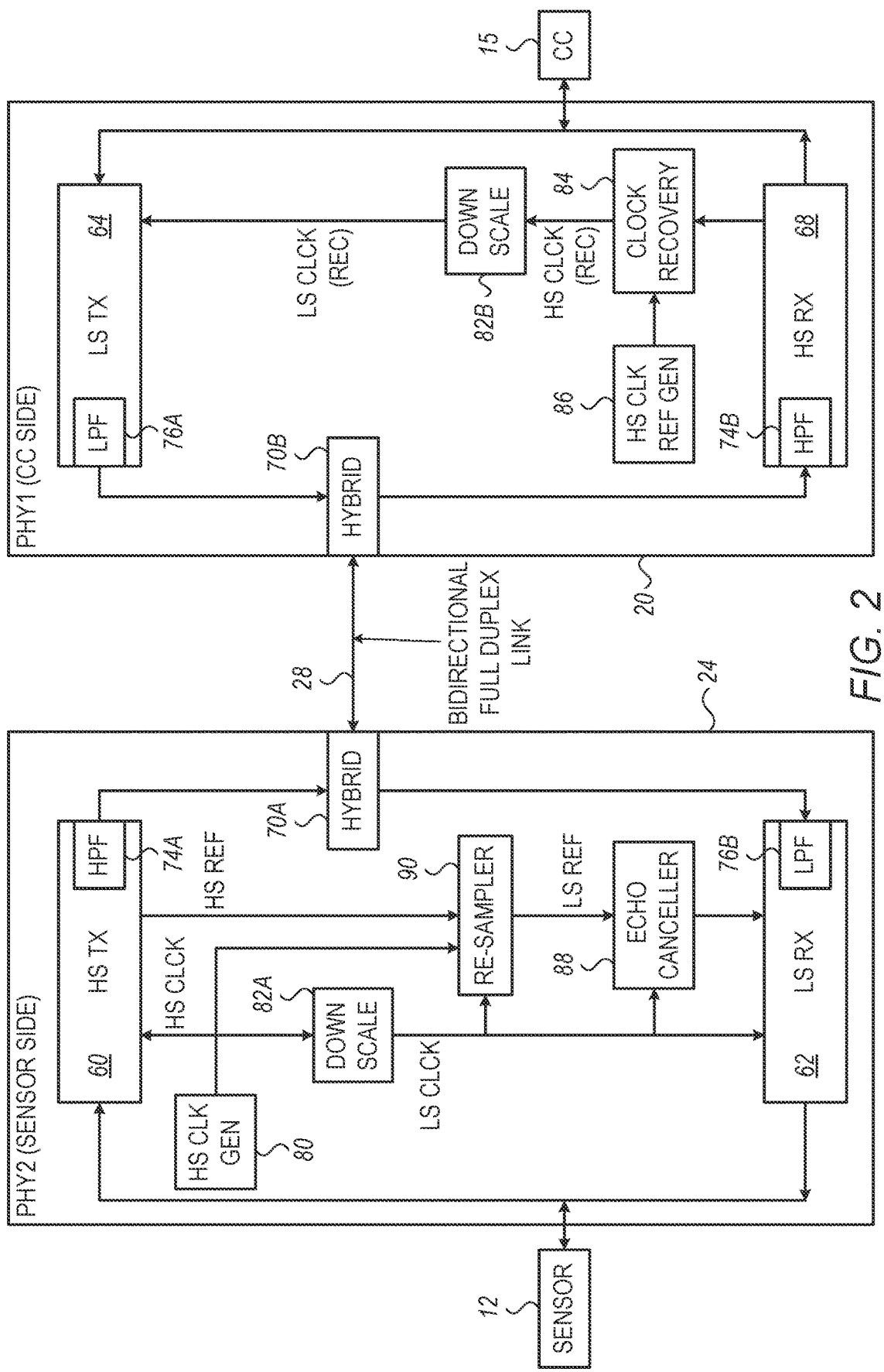
FIG. 2 is a block diagram that schematically illustrates a pair of Ethernet physical layer (PBX) transceivers of FIG. 1, communicating over a full-duplex two-way link, in accordance with an embodiment that is described herein.

FIG. 2 is a block diagram that schematically illustrates a pair of Ethernet physical layer (PHY) transceivers 20 and 24 of FIG. 1, communicating over a full-duplex two-way link 28, in accordance with an embodiment that is described herein.

In some embodiments, PHY transceivers 20 and 24 communicate with one another using asymmetric bandwidth allocation. The term "asymmetric" in the present context means that the transmission data rates differ between the two directions of the two-way link. In the present example, PHY transceiver PHY2, transmits at the upstream data rate and receives at the downstream data rate. PHY transceiver PHY1 transmits at the downstream data rate and receives at the upstream data rate.

In FIG. 2, sensor-transceiver PHY2 comprises a HS transmitter (HS TX) 60 and a LS receiver (LS RX) 62, and processor-transceiver PHY1 comprises a LS transmitter (LS TX) 64 and a HS receiver (HS RX) 68.

In the upstream direction, HS TX 60 receives sensor data from sensor 12, modulates the sensor data to produce upstream signals, and transmits the upstream signals via a hybrid 70A to link 28. In processor-transceiver 20, HS RX 68 receives the upstream signals, demodulates them to extract the sensor data, and sends the sensor data to CC 15.

In the downstream direction, LS transmitter (LS TX) 64 receives control data from CC 15, modulates the control data to produce downstream signals, and transmits the downstream signals via a hybrid 70B to link 28. In sensor-transceiver 24, LS RX 62 receives the downstream signals, demodulates them to extract the control data, and sends the control data to sensor 12.

As noted above, PHY1 and PHY2 communicate over link 28 using an asymmetric data rate configuration. In the disclosed embodiments, the asymmetric configuration is implemented using a Frequency-Division Duplex (FDD) scheme in which a LS frequency band is allocated for the downstream direction and a HS frequency band is allocated for the upstream direction.

In some embodiments, for separating between the LS and HS frequency bands, HS TX 60 and HS RX 68 comprise respective analog High-Pass Filters (HPFs) 74A and 74B. The HPFs are designed to pass frequencies belonging to the HS frequency band and to suppress frequencies belonging to the LS frequency band. Similarly, LS TX 64 and LS RX 62 comprise respective analog Low-Pass Filters (LPFs) 76A and 76B. The LPFs are designed to pass frequencies belonging to the LS frequency band and to suppress frequencies belonging to the HS frequency band.

Next are described clocking schemes used in PHY1 and PHY2 for generating clock signals associated with the upstream (HS) and downstream (LS) baud rates.

In some embodiments, sensor-transceiver PHY2 comprises a HS clock generator 80, which locally generates a HS clock signal, related to the HS baud rate used in transmission of HS signals by HS TX 60. A downscale circuit 82A derives from the HS clock signal a LS clock signal that is related to the baud rate used in the reception of LS signals by LS RX 62.

HS RX 68 of PHY1 receives the HS signals from link 28, and using a clock recovery module 84 recovers the HS clock signal from the HS signals. In some embodiments, the clock recovery module receives a reference HS clock signal generated locally by a HS clock reference generator 86. In this embodiment, the clock recovery uses a Phase Locked Loop (PLL) and a phase interpolator to recover the HS clock signal based on both the received HS signals and the HS reference clock signal. A downscale circuit 84B derives from the recovered HS clock signal, a recovered LS clock signal related to the LS baud rate used by LS TX 64 for downstream transmission.

In a transceiver comprising a transmitter and a receiver, the signals transmitted by the transmitter toward the wired link may be undesirably picked up by the receiver and interfere with reception of signals received from the wired link. To remove or suppress such interference, an echo canceller may be used. An echo canceller, however, typically requires a significant chip area and consumes large amounts of power. In some embodiments, echo cancelation requirements are relaxed due to the FDD scheme, as described herein.

In some embodiments, PHY2 of FIG. 2 comprises an echo canceller 88 that suppresses interference to LS RX 62 reception caused by HS signals transmitted by HS TX 60. In some embodiments, for reducing chip area and power consumption, echo canceller 88 is configured to operate at the LS clock signal generated by downscale circuit 82A. By operating at the low clock rate, a simplified echo canceller (e.g., having a small number of taps, compared to a conventional echo canceler operating at the high clock rate) can be used.

For proper operation of the echo canceller at the LS clock signal, a re-sampler 90 (also referred to as an interpolator-decimator) resamples a HS reference signal provided by HS TX 60 to produce a corresponding LS reference signal, which is input to the echo canceller. Based on the LS reference signal, the echo canceller produces an echo cancelation signal, which LS RX 62 uses for suppressing the interference.

Figure 3:
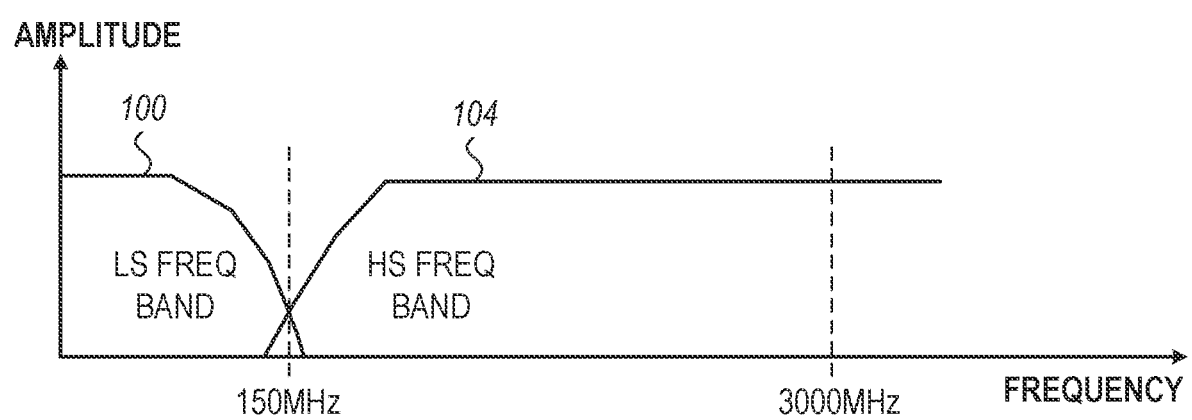
FIG. 3 is a diagram that schematically illustrates frequency bands of a Frequency-Division Duplex (FDD) scheme, applicable in asymmetric communication over a twisted-pair link, in accordance with an embodiment that is described herein.

FIG. 3 is a diagram that schematically illustrates frequency bands of a Frequency-Division Duplex (FDD) scheme, applicable in asymmetric communication over twisted-pair link 28, in accordance with an embodiment that is described herein.

In the diagram, the horizontal axis denotes a frequency axis, measured, e.g., in Hz, and the vertical axis denotes an amplitude (or power) axis, measured, e.g., in Decibels (dB).

The diagram further depicts a LS frequency band (numbered 100) and a HS frequency band (numbered 104). In the present example, the LS frequency band corresponds to downstream LS signals having a data rate of 100 Mbps in accordance with the 100BASE-T1 (802.3bw) specification. The HS frequency band corresponds to upstream HS signals having a data rate of 2.5 Gbps in accordance with the Multi-GigaBASE-T1 (802.3ch) specification.

As shown in the figure, the LS frequency band is highly attenuated above a frequency of 150 MHz, and the HS frequency band is highly attenuated below the frequency of 150 HZ. This provides sufficient separation between the two frequency bands, for eliminating the need of echo cancelation in PHY1.

Figure 4A:
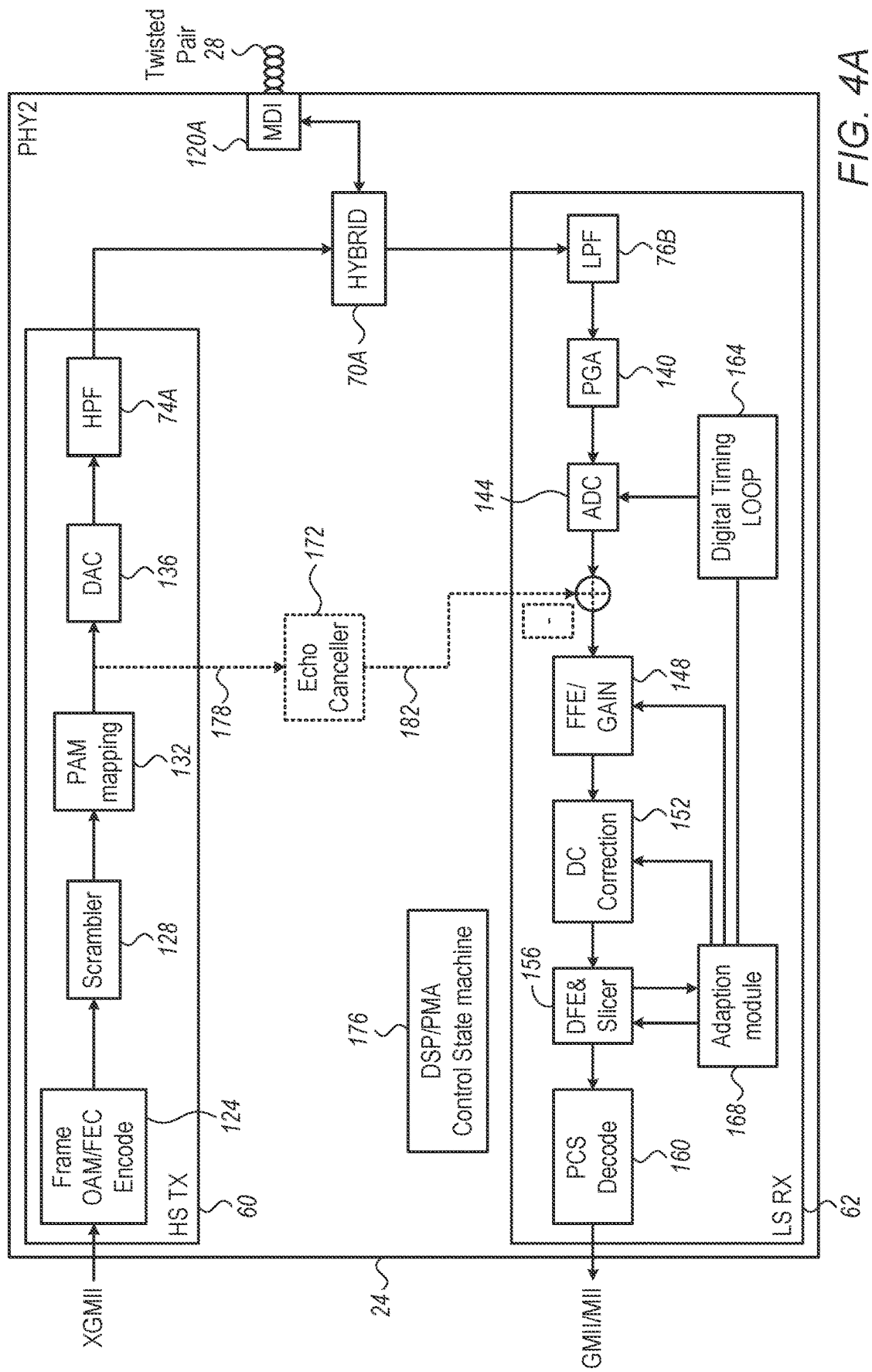
FIGS. 4A and 4B are block diagrams that schematically illustrate detailed structures of respective sensor side and processor-side transceivers, in accordance with embodiments that are described herein.
Figure 4B:
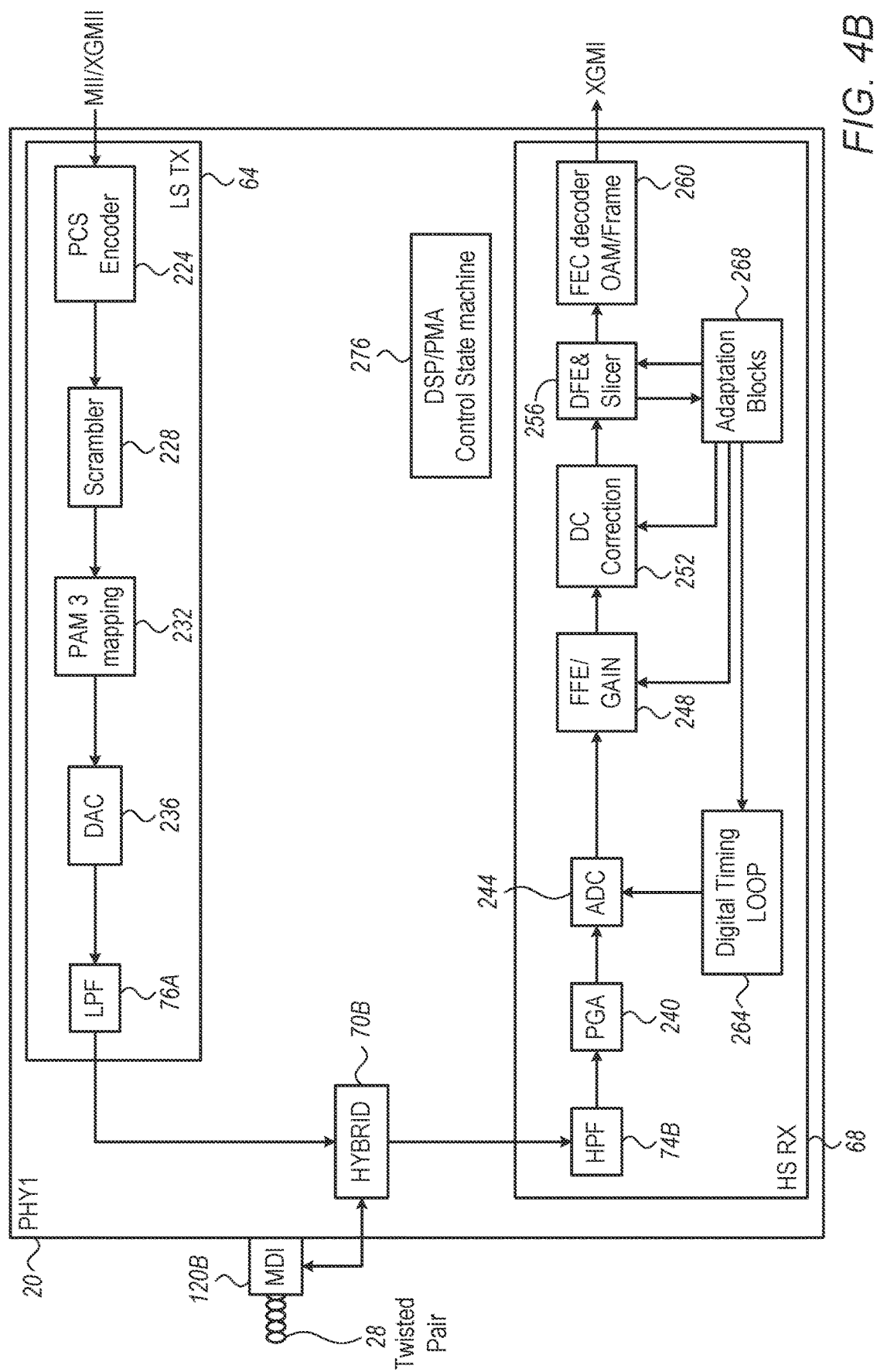

FIGS. 4A and 4B are block diagrams that schematically illustrate detailed structures of respective sensor side and processor-side transceivers, in accordance with embodiments that are described herein.

In FIG. 4A, transceiver PHY2 24 comprises transmitter HS TX (60) and receiver LS RX (62) coupled to hybrid 70A, which in turn is coupled via a Medium-Dependent Interface MDI 120A to twisted-pair link 28.

In the upstream direction, HS TX 60 receives HS data (e.g., sensor data bits from sensor 12) via a 10 Gbps media independent interface—XGMII, for transmission over link 28. An encoder 124 applies to the HS data framing and encoding operations such as Forward Error Correction (FEC) encoding, followed by a scramble 128 that scrambles the bits of the HS data. A modulator 132 maps the scrambled bits to symbols using any suitable modulation scheme such as a Pule Amplitude Modulation (PAM) scheme (e.g., PAM3 or PAM4). A Digital to Analog Converter (DAC) 136 converts the symbols to HS analog signals, which are filtered using analog HPF 74A as described above.

In the downstream direction, LS RX (62) receives downstream LS signals carrying LS data (e.g., control data from CC 15) from link 28 via MDI 120A and hybrid 70A. The LS RX receiver applies to the received LS analog signals an analog LPF 76B as described above. A Programable Gain Amplifier (PGA) 140 adjusts the amplitude of the received LS signals, and an Analog to Digital Converter (ADC) 144 samples the LS signals and converts them to digital signals.

A Feed Forward Equalization (FEE) and gain module 148 equalizes the signals in accordance with the underlying channel response and determines the gain to be applied. A Direct Current (DC) correction module 152 further processes the digital signals to exclude DC and low frequencies. A multi-tap Decision Feedback Equalizer (DFE) and slicer module 156 applies to the digital signals decision feedback equalization to cover the low frequency band allocated for the downstream LS signals, and the slicer makes symbol decisions to recover the symbols that were sent in the LS signals. In some embodiments the DFE is applied when the transmitter is configured to a HS data rate of 2.5 Gbps. In contrast, at 5 Gbps and 10 Gbps HS data rates, the DC correction loop covers the low frequency band and mitigates baseline wander with sufficient margin.

A Physical Coding Sublayer (PCS) decoder 160 performs data decoding (and possibly other data processing, e.g., descrambling) to recover the bitstream that was sent by PHY1 over link 28. The recovered bitstream is output via the XGMII or the Media-independent Interface MII.

In some embodiments, PHY2 comprises a digital timing Loop controller 164, which handles a control loop to acquire and track the phase of the received signals, by controlling the sampling instances of the received signals (by ADC 144).

An adaptation module 168 runs one or more adaptation methods (such as, for example, the Least Mean Square—LMS adaptation) for adapting at least one of the DFE taps, DC correction module, FFE taps and gain, and generates the timing error for the digital timing loop controller. The adaptation methods are based on monitoring the quality of the symbols output by the slicer.

In some embodiments, transceiver PHY2 comprises an echo canceller 172, depicted with dashed lines to indicate that this module is optional. Echo cancelation 172 receives a reference signal 178 from HS TX 60, and based on this reference signal generates an echo cancelation signal 182, which LS RX 62 subtracts from the received signals. In some embodiments, the echo canceller operates at a low rate related to the LS baud rate, and the reference signal (178) from the HS TX is resampled in accordance with the ratio between the HS baud rate and the LS baud rate, as described above.

In some embodiments, PHY2 comprises a Digital Signal Processing (DSP) or Physical Medium Attachment (PMA) sublayer 176 that performs various tasks, e.g., PHY control, link monitor state machine, PMA TX, PMA RX and reset functions.

In FIG. 4B, transceiver PHY1 20 comprises transmitter LS TX (64) and receiver HS RX 68 coupled to hybrid 701, which in turn is coupled via MDI 12013 to twisted-pair link 28.

In the downstream direction, LS TX 64 receives LS data (e.g., control data) via a 10 Gbps media independent interface—XGMII, or MII, for transmission over link 28. A PCS encoder 224 applies to the HS data framing and encoding operations, followed by a scrambler 228. A modulator 232 maps the scrambled bits to symbols using any suitable modulation scheme such as a PAM scheme (e.g., PAM3). A Digital to Analog Converter (DAC) 236 converts the symbols to LS analog signals, which are filtered using analog LPF 76A as described above. LS TX 64 transmits the filtered signals via hybrid 70B and MDI 120B to link 28.

In the upstream direction, HS RX 68 receives upstream HS signals carrying HS data (e.g., sensor data from sensor 12) from link 28 via MDI 120B and hybrid 70B. HS RX 68 applies to the received HS signals an analog HPF 74B as described above. A PGA 240 adjusts the amplitude of the received signals, and an ADC 244 samples the filtered signals and converts them to HS digital signals.

A FFE and gain module 248 equalizes the digital signals in accordance with the underlying channel response and determines the gain to be applied. A DC correction module 252 further processes the digital signals to exclude DC and low frequencies. A multi-tap DFE and slicer module 256 applies to the digital signals decision feedback equalization to cover the low frequency band allocated for the downstream LS signals, and the slicer makes symbol decisions to recover the symbols that were sent in the received HS signals. In some embodiments the DFE is applied when the transmitter is configured to a HS data rate of 2.5 Gbps. In contrast, at 5 Gbps and 10 Gbps HS data rates, the DC correction loop covers the low frequency band/baseline wander with sufficient margin.

A decoder 260 applies to the bits of the symbols framing and decoding operations such as FEC decoding to recover the HS bitstream. The recovered bitstream is output via the XGMII.

In some embodiments, PHY1 comprises a digital timing Loop controller 264, which handles a control loop to acquire and track the phase and frequency of the received HS signals, by controlling the sampling instances of the received signals (by ADC 244).

Adaptation blocks 268 run one or more adaptation methods (such as, for example, the Least Mean Square—LMS adaptation) for adapting at least one of the DFE taps, DC correction module, FFE taps and gain, and generate the timing errors for the digital timing loop controller. The adaptation methods are based on monitoring the quality of the symbols output by the slicer.

It is noted that in the embodiment of FIG. 4B, PH1 does not comprise an echo canceller. Omitting the echo canceller is possible at least due to the separation between the FDD frequency, bands using HPFs 74A and 74B and LPFs 76A and 76B as described above. Moreover, the synchronization between the HS clock signal and the derived LS clock signal also contributes to high quality equalization.

In some embodiments, PHY1 comprises a DSP or PEA sublayer 276 that performs various tasks, e.g., PHY control, link monitor state machines, PMA TX, PMA RX and reset functions.

Figure 5:
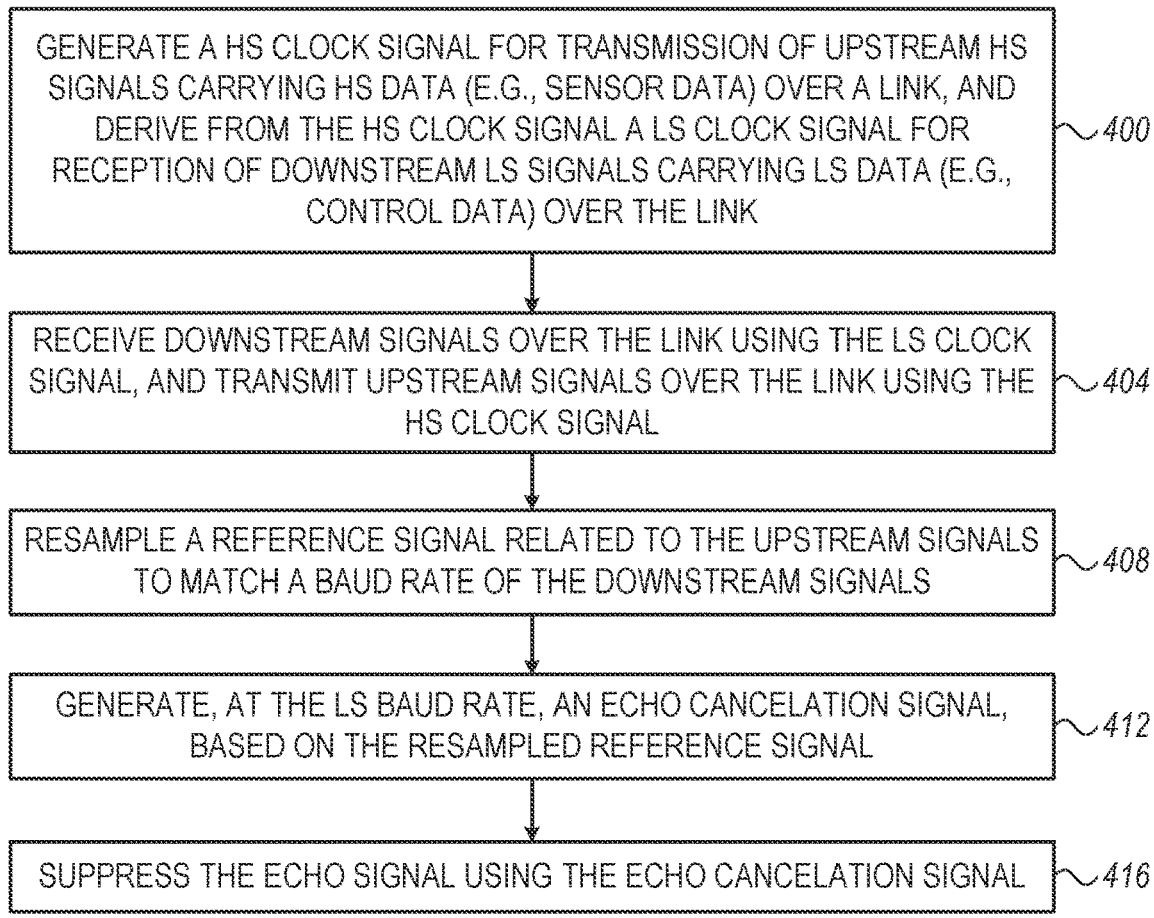
FIG. 5 is a flow chart that schematically illustrates a method for applying low-rate echo cancelation in a sensor-side PHY, in accordance with an embodiment that is described herein.

FIG. 5 is a flow chart that schematically illustrates a method for applying low-rate echo cancelation in a sensor-side PHY, in accordance with an embodiment that is described herein.

The method is described as executed by elements of PHY2 (24) of FIGS. 1, 2 and 4A. In describing the method it is assumed that the sensor-side receives LS Ethernet signals carrying LS data at a LS data rate over the Ethernet link in the downstream direction at a LS baud rate. Furthermore, the sensor-side PHY transmits HS signals carrying HS data at a HS data rate higher than the LS data rate, over the Ethernet link in the upstream direction that is opposite the downstream direction, at a HS baud rate that is higher than the LS baud rate. It is further assumed that an echo signal originating from transmission of the HS signals interfere with reception of LS signals by the LS RX.

The method begins at an operation 400, with HS clock generator 80 generating a HS clock signal for transmission of HS signals carrying HS data (e.g., sensor data) over link 28 (at a corresponding HS baud rate). Further at operation 400, downscale circuit 82A derives from the HS clock signal a LS clock signal used for reception of LS signals carrying LS data (e.g., control data) over the link.

In some embodiments, downscale circuit 82A derives the LS clock signal by dividing the frequency of the HS clock signal by a number defining the ratio between the HS baud rate and the LS baud rate. For example, consider upstream transmission in accordance with the IEEE 803.ch specification, and downstream transmission in accordance with the 100BASE-T1 specification. In this example the HS baud rate is 5625 MHz (or 5625 MHz divided by 4 or 2) and the LS baud rate is 66.67 MHz). In this case, downscale circuit 82A divides the frequency of the HS clock signal—5625 MHZ—by (675/8) to get the correct frequency of LS clock signal—66.67 MHZ.

At a bidirectional communication operation 404, LS RX 62 of PHY2 receives downstream LS signals over the link using the LS clock signal, and HS TX 60 of PHY2 transmits HS signals over the link using the HS clock signal. In the present example, PHY2 performs bidirectional communication using an FDD scheme, as described above.

At a resampling operation 408, re-sampler 90 resamples a reference signal related to the transmitted HS signals, to match the LS baud rate of the downstream LS signals. In some embodiments, the re-sampler resamples the reference signal by a number defining the ratio between the HS baud rate and the LS baud rate. In the example above, re-sampler 90 interpolates the reference signal by a factor of 8 and decimates the reference signal by a factor of 675 for achieving the division factor (675/8) noted above. Alternatively, in some embodiments other decimation and interpolation schemes may be used. For example, interpolation by 8 may be implemented using two interpolation stages having interpolation factors 2 and 4. Similarly, decimation by 675 may be implemented using two decimation stages having decimation factors 25 and 27.

At an echo cancelation signal generation operation 412, echo canceller 88 generates, at the LS baud rate, an echo cancelation signal, based on the resampled reference signal.

At an echo cancelation operation 416, LS RX 62 suppresses the echo signal using the echo cancelation signal. In an embodiment, the LS RX subtracts the echo cancelation signal from the received LS signals, at the LS baud rate that is lower than the HS baud rate. Following operation 416, the method terminates.

Figure 6:
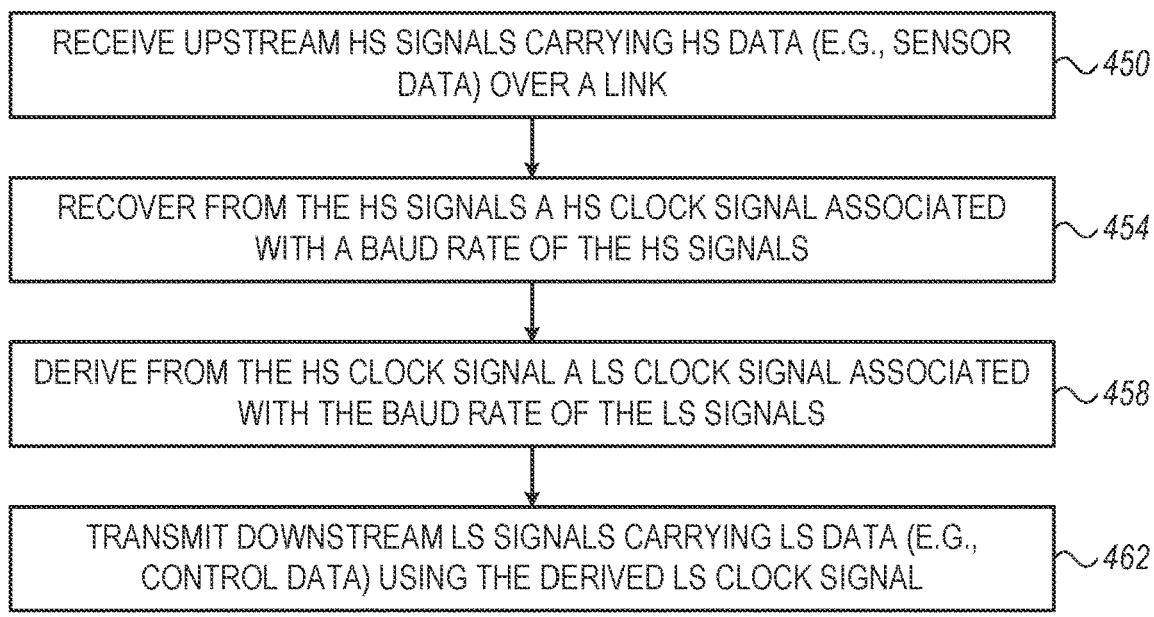
FIG. 6 is a flow chart that schematically illustrates a method for deriving a clock signal for transmission of LS downstream signals, in accordance with an embodiment that is described herein.

FIG. 6 is a flow chart that schematically illustrates a method for deriving a clock signal for transmission of LS downstream signals, in accordance with an embodiment that is described herein.

The method is described as executed by elements of PHY1 (20) of FIGS. 1, 2 and 4B.

In describing the method, it is assumed that PHY1 receives HS Ethernet signals carrying HS data at a HS data rate over the Ethernet link in the upstream direction at a HS baud rate. Furthermore, PHY1 transmits LS Ethernet signals carrying LS data at a LS data rate lower than the HS data rate, over the Ethernet link in an upstream, direction that is opposite the downstream direction, at a LS baud rate that is lower than the HS baud rate.

At a reception. operation 450, HS RN 68 of PHY receives HS Ethernet signals carrying HS data (such as sensor data) over link 28. At a clock recovery operation 454, PHY1 recovers the HS clock signal from the received HS signals. The HS clock signal is associated with the HS baud rate used in transmission of the HS signals. At a LS clock derivation operation 458, downscale circuit 82B derives from the recovered HS clock a LS clock signal associated with the LS baud rate of transmitted LS signals in the downstream direction. At a LS transmission operation 462, LS TX 64 of PHY1 transmits the downstream LS signals (e.g., carrying control data) over the link using the derived LS clock signal. Following operation 462 the method terminates.

The configurations of PHY transceivers 20 and 24 and their components, such as data components related to echo cancelation and to clock generation, as shown in FIGS. 1, 2, 4A and 4B, are example configurations that are depicted solely for the sake of clarity. In alternative embodiments, any other suitable configurations can be used.

The different elements of PHY transceivers 20 and 24 and their components may be implemented using dedicated hardware or firmware, such as using hard-wired or programmable logic, e.g., in an Application-Specific Integrated Circuit (ASIC) or Field-Programmable Gate Array (FPGA). Additionally or alternatively, some functions of PHY transceivers 20 and 24, e.g., functions of transmitters 60 and 64, receivers 62 and 68, re-sampler 90 and echo canceller 88, may be implemented in software and/or using a combination of hardware and software elements. Elements that are not mandatory for understanding of the disclosed techniques have been omitted from the figure for the sake of clarity.

In some embodiments, some functions of PHY transceivers 20 and 24, e.g., functions HS TX 60, LS TX 64, LS RX 62, HS RX 68, re-sampler 90, echo canceller 88 and DSP/PMA sublayer 176, may be implemented in one or more programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Although the embodiments described herein mainly address asymmetric data rates in communicating with sensors in a vehicle network, the methods and systems described herein can also be used in other applications, such as in communication between two or more computing platforms or communication hubs.

Although the embodiments described herein mainly address PHY devices for automotive asymmetric Ethernet communication, the methods and systems described herein can also be used in other applications, such as in Security camera and monitoring.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Ethernet Physical Layer (PHY) device, comprising:
   a link interface, configured to connect to a full-duplex wired Ethernet link; and
   a transceiver, configured to:
      receive first Ethernet signals carrying first data at a first data rate over the Ethernet link in a first direction at a first baud rate;
      transmit second Ethernet signals carrying second data at a second data rate higher than the first data rate, over the Ethernet link in a second direction that is opposite the first direction, at a second baud rate that is higher than the first baud rate;
      resample a reference signal that is related to the second Ethernet signals to match the first baud rate of the first Ethernet signals;
      generate from the resampled reference signal, at the first baud rate, an echo cancelation signal indicative of an echo signal originating from the second Ethernet signals and interfering with reception of the first Ethernet signals; and
      suppress the echo signal from the first Ethernet signals using the echo cancelation signal.

2. The Ethernet PHY device according to claim 1, wherein the transceiver is configured to resample the reference signal by filtering the reference signal using a re-sampling filter, and to suppress the echo signal from the first Ethernet signals by subtracting the echo cancelation signal from the first Ethernet signals, at the first baud rate that is lower than the second baud rate.

3. The Ethernet PHY device according to claim 1, wherein the first Ethernet signals occupy a first frequency band, wherein the second Ethernet signals occupy a second frequency band different from the first frequency band, and wherein the transceiver is configured to simultaneously receive the first Ethernet signals in the first frequency band over the Ethernet link and transmit the second Ethernet in the second frequency band over the Ethernet link.

4. The Ethernet PHY device according to claim 3, wherein the transceiver comprises:
   a first analog filter tuned to the first frequency band and configured to filter the first Ethernet signals received from the Ethernet link; and
   a second analog filter tuned to the second frequency band and configured to filter the second Ethernet signals transmitted to the Ethernet link.

5. The Ethernet PHY device according to claim 4, wherein the first analog filter is configured to suppress frequencies above the first data rate, and wherein the second analog filter is configured to suppress frequencies below the second data rate.

6. The Ethernet PHY device according to claim 1, wherein the transceiver is configured to locally generate a second clock signal for transmission of the second Ethernet signals over the Ethernet link at the second baud rate, and to derive a first clock signal from the second clock signal for reception of the first Ethernet signals at the first baud rate.

7. The Ethernet PHY device according to claim 6, wherein the transceiver is configured to derive the first clock signal from the second clock signal, by applying to the second clock signal a circuit that divides a frequency of the second clock by a number defining a ratio between the second baud rate and the first baud rate.

8. The Ethernet PHY device according to claim 1, wherein the transceiver is locally coupled to a sensor in a vehicle, the sensor providing the second data to the transceiver for transmission, and is configured to receive the first data from a processor in the vehicle over the Ethernet link.

9. A method for communication, comprising:
   in an Ethernet Physical Layer (PHY) device connected to a full-duplex wired Ethernet link,
   receiving first Ethernet signals carrying first data at a first data rate over the Ethernet link in a first direction at a first baud rate;
   transmitting second Ethernet signals carrying second data at a second data rate higher than the first data rate, over the Ethernet link in a second direction that is opposite the first direction, at a second baud rate that is higher than the first baud rate;
   resampling a reference signal that is related to the second Ethernet signals to match the first baud rate of the first Ethernet signals;
   generating from the resampled reference signal, at the first baud rate, an echo cancelation signal indicative of an echo signal originating from the second Ethernet signals and interfering with reception of the first Ethernet signals; and
   suppressing the echo signal from the first Ethernet signals using the echo cancelation signal.

10. The method according to claim 9, wherein resampling the reference signal comprises filtering the reference signal using a re-sampling filter, and wherein suppressing the echo signal from the first Ethernet signals comprises subtracting the echo cancelation signal from the first Ethernet signals, at the first baud rate that is lower than the second baud rate.

11. The method according to claim 9, wherein the first Ethernet signals occupy a first frequency band, wherein the second Ethernet signals occupy a second frequency band different from the first frequency band, and comprising simultaneously receiving the first Ethernet signals in the first frequency band over the Ethernet link and transmitting the second Ethernet in the second second frequency band over the Ethernet link.

12. The method according to claim 11, and comprising applying a first analog filter tuned to the first frequency band to filter the first Ethernet signals received from the Ethernet link, and applying a second analog filter tuned to the second frequency band and configured to filter the second Ethernet signals transmitted to the Ethernet link.

13. The method according to claim 12, wherein applying the first analog filter comprises suppressing frequencies above the first data rate, and wherein applying the second analog filter comprises suppressing frequencies below the second data rate.

14. The method according to claim 9, and comprising locally generating a second clock signal for transmission of the second Ethernet signals over the Ethernet link at the second baud rate, and deriving a first clock signal from the second clock signal for reception of the first Ethernet signals at the first baud rate.

15. The method according to claim 14, wherein deriving the first clock signal from the second clock signal comprises applying to the second clock signal a circuit that divides a frequency of the second clock by a number defining a ratio between the second baud rate and the first baud rate.

16. The method according to claim 9, wherein the Ethernet PHY device is locally coupled to a sensor in a vehicle, the sensor providing the second data to the Ethernet PHY device for transmission, and comprising receiving the first data from a processor in the vehicle over the Ethernet link.

* * * * *